S. C. BETTS & A. BOUCHER.
COUPLING DEVICE.
APPLICATION FILED MAR. 26, 1912.
1,041,415.
Patented Oct. 15, 1912.
2 SHEETS—SHEET 1.
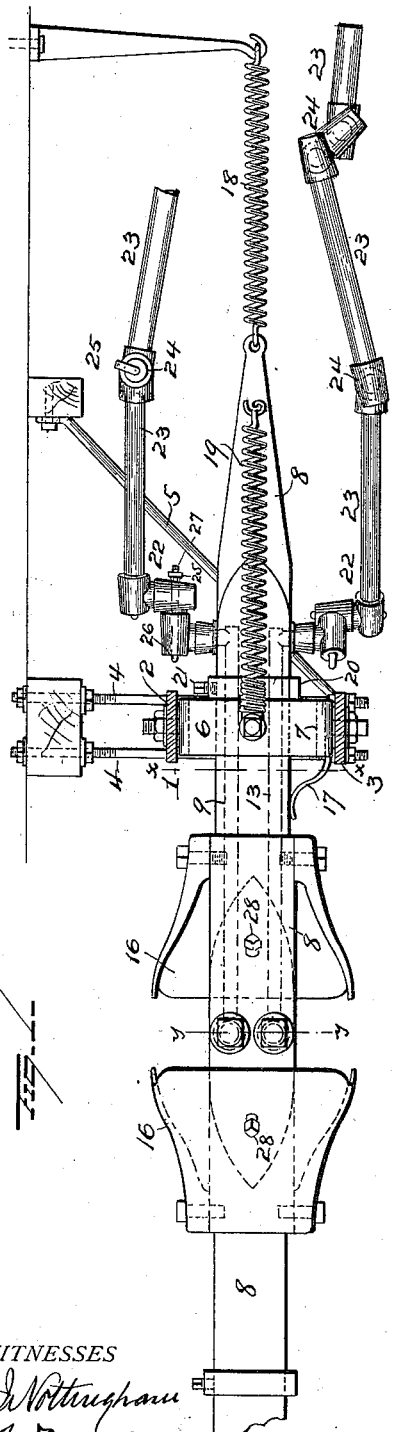
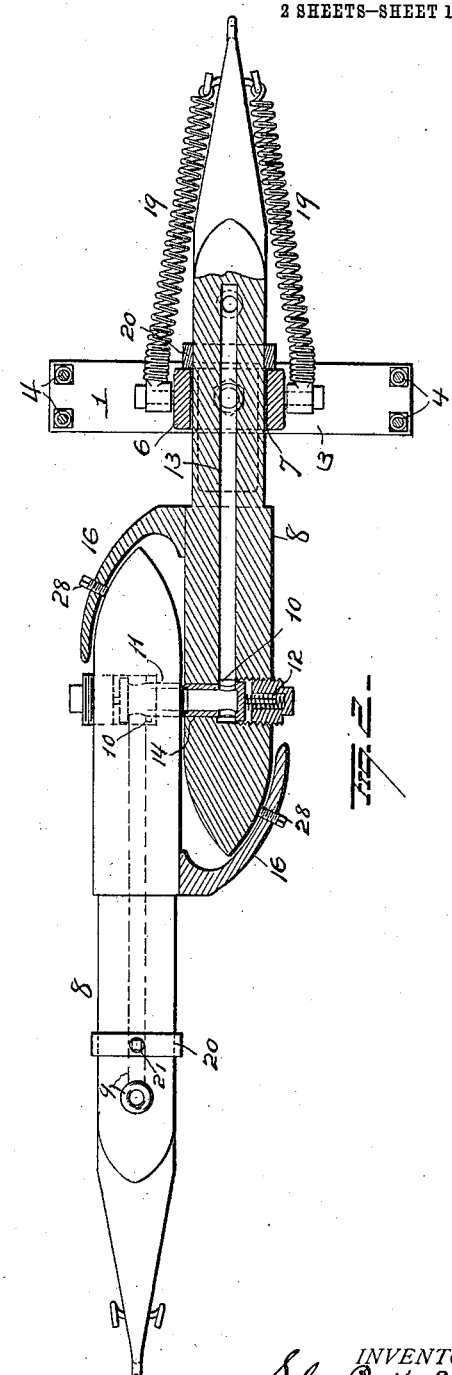

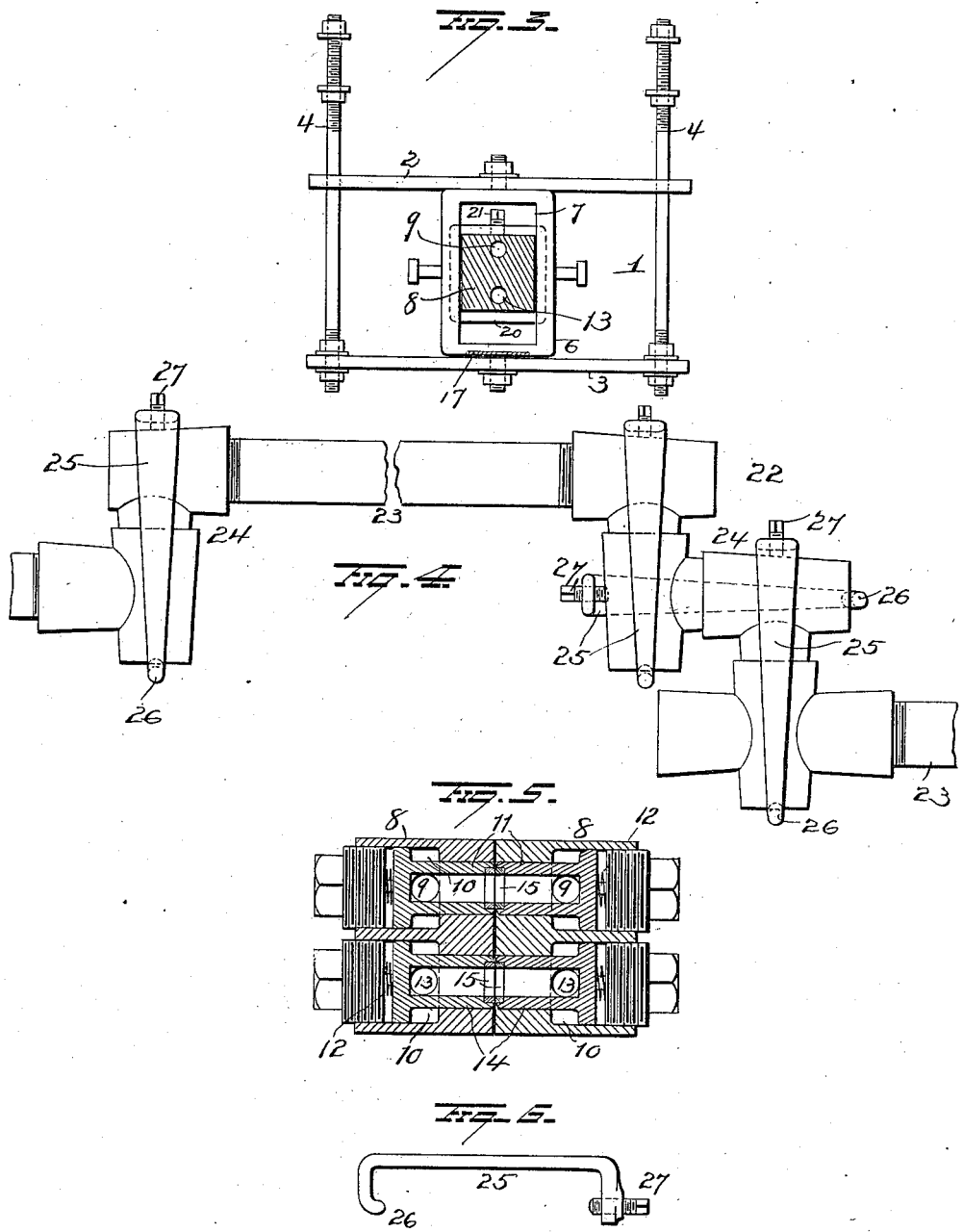

UNITED STATES PATENT OFFICE.

SOLOMON C. BETTS, OF MAUMEE, OHIO, AND AMOS BOUCHER, OF SCOTTVILLE, MICHIGAN.

COUPLING DEVICE.

1,041,415.  Specification of Letters Patent.  Patented Oct. 15, 1912.

Application filed March 26, 1912. Serial No. 686,458.

*To all whom it may concern:*

Be it known that we, SOLOMON C. BETTS, of Maumee, in the county of Lucas and State of Ohio, and AMOS BOUCHER, of Scottville, in the county of Mason and State of Michigan, have invented certain new and useful Improvements in Coupling Devices; and we do hereby declare the following to be a full, clear, and exact description of the invention, such as will enable others skilled in the art to which it appertains to make and use the same.

This invention relates to improvements in coupling devices and more particularly to such as are adapted for use as train pipe couplings,—one object of the invention being to construct the devices in such manner that sections thereof carried by two cars will automatically connect the train pipes when the cars are brought together in coupling.

A further object is to so construct the coupling devices and mount them on the car in such manner that they will readily adapt themselves to the vibrations of the car when running and prevent accidental uncoupling of the train pipes.

With these and other objects in view, the invention consists in certain novel features of construction and combinations of parts as hereinafter set forth and pointed out in the claims.

In the accompanying drawings, Figure 1 is an elevation showing the application of our improvements. Fig. 2 is a plan view. Fig. 3 is a transverse section on the line *x—x* of Fig. 1. Fig. 4 is a view showing the jointed pipe construction. Fig. 5 is a sectional view on the line *y—y* of Fig. 1, and Fig. 6 is a detail view of one of the yokes 25.

1 represents a frame comprising plates 2—3 spaced apart and secured to the sill of a car by means of bolts 4 and brace rods 5. A block 6 is swiveled between the plates 2—3 of the frame and provided with a vertical elongated slot 7 through which a coupling bar 8 freely passes,—said coupling bar being provided throughout a portion of its length with a duct 9, the forward end of which communicates with a lateral outlet 10 normally closed (when the coupling is not in use) by means of a tubular valve 11 which is pressed against its seat by a spring 12, this valve being made of sufficient length to project beyond the inner side face of the coupling bar when it is closed.

We have above referred to a single duct in the coupling bar and this is sufficient for the air brake pipe connection when the devices are used on freight cars, but when our improvements are to be applied to passenger cars which are heated by steam, it is desirable to provide a second duct 13 in the coupling bar and a valve 14 (the same in construction as the valve 11, above described) will be provided for this duct, thus providing coupling means for the steam pipes as well as for the brake pipes. In order to insure air tight and steam tight connections between the valves on two coupling bars, said valves are surrounded by yielding gaskets 15 which are secured to the inner faces of said bars.

The forward end of each coupling bar has a general conical or tapering shape and this free end of one coupling bar will engage the beveled inner faces of a guard 16 secured to the other coupling bar and hence when two cars are brought together, as in coupling, the two coupling bars will be guided by the guards 16 and the valves of one coupling bar will engage and depress the valves of the other coupling bar and the valves of both coupling bars will be thus automatically opened and the train pipes connected with the respective coupling bars automatically coupled together.

The guard above referred to may be made in a single casting and secured by bolts to the coupling bar or it may be cast integral with the latter.

Each coupling bar projects an appreciable distance rearwardly from the frame 1 and is capable of longitudinal and also vertical movements in the elongated slot 7 of the pivoted block 6. In order to yieldingly sustain the coupling bar in an approximately horizontal position, a spring 17 is secured at one end to the block 6 and at its other end bears against the under face of the coupling bar forwardly of said block.

A spring 18 is secured at one end to the rear end of the coupling bar and at its other end, said spring is secured to the under frame of the car. This spring tends to pull the coupling bar rearwardly but it is opposed in such action by springs 19—19 secured at their rear ends to the rear portion of the coupling bar and at their forward ends to respective sides of the swiveled bar 6. Longitudinal movement in a forward or outward direction, of the coupling bar is limited by means of a collar 20 adjustably secured to said coupling bar by means of a set screw 21 and adapted to engage the rear face of the swiveled block 6.

From the construction and arrangement of parts above described, it is apparent that the coupling bar can swing horizontally by reason of its passing through the swiveled block 6 and it will also be seen that said coupling bar can have yielding vertical and longitudinal movements through the elongated slot of said swiveled block, and thus the coupling bar can accommodate itself to the vibrations to which it is subjected and the accidental uncoupling of two coupling bars will be obviated.

The train pipes 22 are connected with the ducts 9—13 in the coupling bar by means of flexible pipes, each comprising a plurality of short pipe sections 23 loosely connected together by means of swivel-couplings 24, said couplings being so disposed relatively to each other that the flexible pipe as a whole can move in all directions and thus accommodate itself to the movements or vibrations of the coupling bar and the car. The two parts of each swivel coupling are connected together by means of a yoke 25 provided at one end with a hook or projection 26 to engage one coupling part and provided at the other end with a set screw 27 to engage the other coupling part and thus the two coupling parts can be connected together with sufficient rigidity but without interfering with their free relative movements and by the use of the set-screws 27, the connection between the parts of the swivel-couplings can be adjusted for wear.

In order to compensate for wear and to insure the intimate connection of two coupling-bars, the guards 16 are provided with set screws 28 which pass through their outer walls, the inner end of the set screws in the guard on one coupling bar being adapted to engage the other coupling bar, and thus insure the intimate engagement of the two coupling-bars and the proper connection of the ducts thereof.

Various slight changes might be made in the details of construction of our invention without departing from the spirit thereof or limiting its scope and hence we do not wish to restrict ourselves to the precise details herein set forth.

Having fully described our invention what we claim as new and desire to secure by Letters-Patent, is:

1. In coupling devices for train pipes, the combination with a swiveled block and means for supporting same on a car, said swiveled block provided with an elongated opening, of a coupling bar freely movable through said elongated slot of the swiveled block and provided with a duct and with a valve at the forward end of said duct, a spring attached to said coupling bar and tending to move the same rearwardly, springs attached to the coupling bar and to the swiveled block and tending to move the coupling bar forwardly, and means for limiting the forward movement of said coupling bar.

2. In coupling devices for train pipes, the combination with a frame to be secured to a car, a block mounted in said frame and provided with vertical pivots, said block having a vertical elongated slot, of a coupling bar passing through the slotted block and provided with a valved duct, a spring secured to said block and bearing against the under face of the coupling bar, springs tending to move the coupling bar forwardly, and a spring tending to move the coupling bar rearwardly.

3. In coupling devices for train pipes, the combination with a coupling bar and means for supporting the same, said coupling bar having a duct provided at its forward end with a lateral valved outlet, of a guard secured to the coupling bar rearwardly of said valved outlet and having beveled inner faces to direct the forward end of another coupling bar into coupling relation, and a set screw passing through the outer wall of said guard.

4. In coupling devices for train pipes, the combination with a train pipe, a coupling bar and means for yieldingly supporting the latter, said coupling bar having a duct provided at its forward end with a lateral valved outlet, of a flexible pipe connection between the train pipe and the duct in the coupling bar, said pipe connection comprising a plurality of pipe sections connected together by swivel-couplings, a yoke connecting the parts of each swivel-coupling, and a set screw passing through one end of each yoke and engaging the adjacent part of the swivel-coupling.

5. In coupling devices for train pipes, the combination with a train pipe, a coupling bar and means for yieldingly supporting the latter, said coupling bar having a duct provided at its forward end with a lateral valved outlet, of a flexible pipe connection between the train pipe and the duct in the coupling bar, said pipe connection comprising a plurality of pipe sections connected together by swivel-couplings, and a yoke connecting the parts of each swivel-coupling.

In testimony whereof, we have signed this specification in the presence of two subscribing witnesses.

SOLOMON C. BETTS.
AMOS BOUCHER.

Witnesses:
H. P. WILCOX,
C. P. BIGBY,
K. E. LOZON,
ROBERT J. QUAIL.

Copies of this patent may be obtained for five cents each, by addressing the "Commissioner of Patents, Washington, D. C."